US010917367B2

(12) United States Patent
Ji et al.

(10) Patent No.: US 10,917,367 B2
(45) Date of Patent: Feb. 9, 2021

(54) MITIGATING ACTIVITY PROCESSING REQUESTS

(71) Applicant: ADVANCED NEW TECHNOLOGIES CO., LTD., George Town (KY)

(72) Inventors: Jing Ji, Hangzhou (CN); Yanchun Zhu, Hangzhou (CN); Yingnan Ma, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 15/836,274

(22) Filed: Dec. 8, 2017

(65) Prior Publication Data
US 2018/0102993 A1    Apr. 12, 2018

Related U.S. Application Data

(63) Continuation of application No. PCT/CN2016/084625, filed on Jun. 3, 2016.

(30) Foreign Application Priority Data

Jun. 11, 2015  (CN) .......................... 2015 1 0320204

(51) Int. Cl.
*H04L 12/58*   (2006.01)
*H04L 29/08*   (2006.01)

(52) U.S. Cl.
CPC ............ *H04L 51/046* (2013.01); *H04L 51/28* (2013.01); *H04L 51/32* (2013.01);
(Continued)

(58) Field of Classification Search
CPC ....... H04L 51/046; H04L 51/28; H04L 51/32; H04L 67/1061; H04L 67/2823; H04L 67/327
See application file for complete search history.

(56) References Cited

U.S. PATENT DOCUMENTS

| 9,811,833 | B1 * | 11/2017 | Garber ................... G06Q 30/00 |
| 2004/0162871 | A1 * | 8/2004 | Pabla ..................... H04W 8/005 |
| | | | 709/201 |
| 2010/0023341 | A1 | 1/2010 | Ledbetter et al. |
| 2010/0135155 | A1 * | 6/2010 | Sankhavaram ......... H04L 47/10 |
| | | | 370/230 |
| 2010/0325665 | A1 * | 12/2010 | Mountain .......... H04N 21/4622 |
| | | | 725/44 |

(Continued)

FOREIGN PATENT DOCUMENTS

| CN | 101682544 | 3/2010 |
| CN | 102035828 | 4/2011 |

(Continued)

OTHER PUBLICATIONS

International Search Report issued by the International Searching Authority in International Application No. PCT/CN2016/084625 dated Aug. 22, 2016; 8 pages.

(Continued)

*Primary Examiner* — Joe Chacko
(74) *Attorney, Agent, or Firm* — Fish & Richardson P.C.

(57) ABSTRACT

An affair processing request is received from a first network node. First affair information determined by the first network node is received. A type of to-be-acquired second affair information excluded from the received first affair information is determined. First information comprising the type of the to-be-acquired second affair information is transmitted to a second network node. Second information is received, the second information including content of the second affair information fed back from the second network node. An affair of the affair processing request is processed on the basis of the received first affair information and the received content of the second affair information.

20 Claims, 10 Drawing Sheets

(52) U.S. Cl.
CPC ...... *H04L 67/1061* (2013.01); *H04L 67/2823* (2013.01); *H04L 67/327* (2013.01)

(56) References Cited

U.S. PATENT DOCUMENTS

| | | | | |
|---|---|---|---|---|
| 2011/0080850 A1* | 4/2011 | Klein | .................. | H04L 12/2801 370/254 |
| 2013/0268377 A1 | 10/2013 | Jessup et al. | | |
| 2014/0059215 A1* | 2/2014 | Johnsen | .............. | H04L 61/2046 709/224 |

FOREIGN PATENT DOCUMENTS

| | | |
|---|---|---|
| CN | 104685855 | 6/2015 |
| JP | 2002092020 | 3/2002 |
| JP | 2003168014 | 6/2003 |
| JP | 2006072423 | 3/2006 |
| KR | 1020060070639 | 6/2006 |
| KR | 20120004436 | 1/2012 |
| KR | 20120119954 | 11/2012 |
| KR | 20140122329 | 10/2014 |
| WO | WO 2008127891 | 10/2008 |
| WO | WO 2014031891 | 2/2014 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

\* cited by examiner

MITIGATING ACTIVITY PROCESSING REQUESTS

This application is a continuation of PCT Application No. PCT/CN2016/084625, filed on Jun. 3, 2016, which claims priority to Chinese Patent Application No. 201510320204.8, filed on Jun. 11, 2015, and each application is incorporated by reference in its entirety.

BACKGROUND

With the arrival of the Internet era, the Internet has been widely applied in people's daily activities, such as browsing various websites to study, work, and recreate. In this instance, various affairs in people's daily life with the Internet can be processed by and presented using one or more networks.

Generally, a network includes multiple network nodes. These network nodes may be located in different locations and provide various functionalities. For instance, a network node may be located on a server and on a client terminal. In other instances, various network nodes may be provided in networks such as a gateway. These network nodes may exchange information to complete affair processing. During processing of an affair in a network, it is generally necessary to acquire various kinds of affair information corresponding to the affair, in order to generate an affair processing request according to the acquired various kinds of affair information, and complete processing of the affair according to the affair processing request. The affair information includes an information type and corresponding information content.

Typically, during actual processing of an affair, various kinds of affair information corresponding to the affair to be processed are generally acquired from a single network node. However, in some implementations, various kinds of affair information generally correspond to affairs including at least two types of affair information, and it is possible to acquire the types of affair information from two different network nodes. In an instance with at least two types of affair information, if the server only acquires affair information from a single network node, the acquired affair information may have lower than possible accuracy when compared to acquiring affair information from all applicable network nodes.

SUMMARY

The present disclosure describes processing affairs acquired from various network nodes.

In an implementation, an affair processing request is received from a first network node. First affair information determined by the first network node is received. A type of to-be-acquired second affair information excluded from the received first affair information is determined. First information comprising the type of the to-be-acquired second affair information is transmitted to a second network node. Second information is received, the second information including content of the second affair information fed back from the second network node. An affair of the affair processing request is processed on the basis of the received first affair information and the received content of the second affair information.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, in order to realize one or more of the following advantages. First, the described subject matter can improve the processing of affair information by acquiring affair information from multiple nodes for improved accuracy. Second, the described subject matter can alleviate a processing burden put on a server and reduce an impact to network resources utilized by the server.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DETAILED DESCRIPTION

Figure 1:
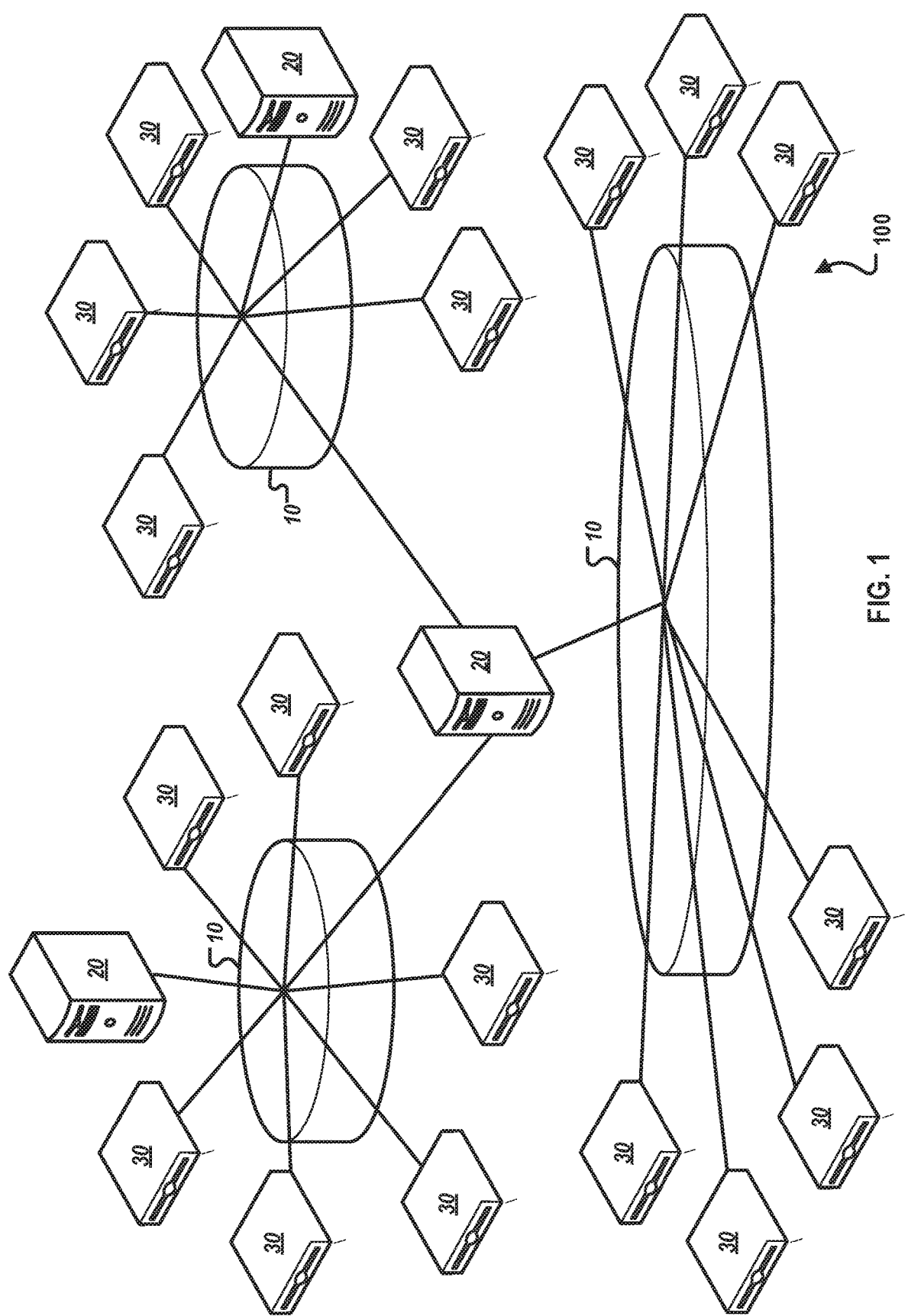
FIG. 1 is a block diagram illustrating an example of a computer-implemented system configured to process affair information from various nodes, according to an implementation of the present disclosure.

The following detailed description describes processing affair information from various nodes, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted to not obscure one or more described implementations. The present disclosure is not intended to be limited to the described or illustrated implementations, but to be accorded the widest scope consistent with the described principles and features.

With the arrival of the Internet era, the Internet has been widely applied in people's daily activities, such as browsing various websites to study, work, and recreate. In this instance, various affairs in people's daily life with the Internet can be processed by and presented using one or more networks.

Generally, a network includes multiple network nodes. These network nodes may be located in different locations and provide various functionalities. For instance, a network node may be located on a server and on a client terminal. In other instances, various network nodes may be provided in networks such as a gateway. These network nodes may exchange information to complete affair processing. During processing of an affair in a network, it is generally necessary to acquire various kinds of affair information corresponding to the affair, in order to generate an affair processing request according to the acquired various kinds of affair information, and complete processing of the affair according to the affair processing request. The affair information includes an information type and corresponding information content.

Typically, during actual processing of an affair, various kinds of affair information corresponding to the affair to be processed are generally acquired from a single network node. However, in some implementations, various kinds of affair information generally correspond to affairs including at least two types of affair information, and it is possible to acquire the types of affair information from two different network nodes. In an instance with at least two types of affair information, if the server only acquires affair information from a single network node, the acquired affair information may have lower than possible accuracy when compared to acquiring affair information from all applicable network nodes.

As an example, it may be beneficial to determine content information of an affair processing request over an instant messaging application (IM APP) between a first networking node and a second networking node, where, for instance, the affair processing request can include a gift-giving request. A user logged on to an IM APP at a client terminal of the first networking node can send a gift giving request to a user logged on to the IM APP at a client terminal at a second network node. A server between the first networking node and the second networking node determines information corresponding to the gift giving request such as the content of the gift and address information of the recipient receiving the gift. The first network node and the second network node provide content information of the gift-giving request to the server to complete the ordering request.

In some implementations, the network can be a social network, a payment network, or a network combining the two, or may be a structure, which is adaptively improved and changed based on a conventional network (such as, a social network or a payment network) to be applicable to a network application. For example, a social network may be applied to FACEBOOK, TWITTER, YOUTUBE, LINKEDIN, WECHAT, WEIBO, and so on, or other types of instant messaging networks. Similarly, a payment network may be applied to PAYPAL, ALIPAY, or other payment networks. Moreover, functions of the payment network and social network can be superposed. With the function of superposition, data representing the real-world property may need to be superposed and integrated.

In some implementations, the network can be another network, such as a network having an account or user attribute, a network such as e-business network, or a network combining multiple networks, such as a network combining an e-business network and a payment network. For example, the network may combine functionality of LINEDKIN and PAYPAL.

In some implementations, a network node may include both social attributes and payment attributes. For instance, with the social attribute, basic description information can be assigned to the nodes. This basic description information may include human-associated basic attributes. For example, human-associated basic attributes can include user information, such as whether male or female, age, and height. In addition to human-associated basic natural attributes, the basic description information may further include human-associated social relation attributes between humans as well as between humans and a corresponding organization. For instance, the social relation attributes can include relationships such as employee-to-employee and employee-to-boss relationships.

Alternatively, with the payment attribute, basic payment description information may be assigned to the nodes. This basic payment description information may be assigned to the nodes, which includes, for example, bank accounts, virtual currencies, or corresponding equivalents, or even direct coupons representing real-world currencies. In addition, this includes depositories of cash amounts linked to bank accounts corresponding to a user. In some implementations, the virtual currencies or equivalences have a certain conversion relationship with the direct coupon, and, therefore, can represent a network-world wealth attribute of a network node when associated with the network node. For instance, the coupon may correspond to a value of 100 Yuan, which may correspond to a worth of the network node. In some implementations, the integration of the social network and the payment network can enable a network node having a social relation to have a payment virtual function. For instance, the payment virtual function allows a network node to pay a portion or all of the wealth corresponding to that network node to a secondary network node.

FIG. 1 is a block diagram illustrating an example of a computer-implemented system 100 configured to process affair information from various nodes, according to an implementation of the present disclosure. For example, the computer implemented system 100 can represent an affair processing system that includes one or more servers 20, one or more client terminals 30, one or more networks 10 configured to connect the server 20 and the client terminal

30. The one or more servers 20 may receive affair processing requests sent by the client terminals 30 through the network 10, and acquire, from the corresponding client terminals 30, various pieces of affair information corresponding to the affair processing requests, in order to complete affair processing according to the various pieces of affair information. For instance, affair processing requests can include money giving requests, gift giving requests, and ticket ordering requests. In some implementations, the server 20 may be a single server or a group of servers that include multiple servers spanned over a network 10.

Figure 2:
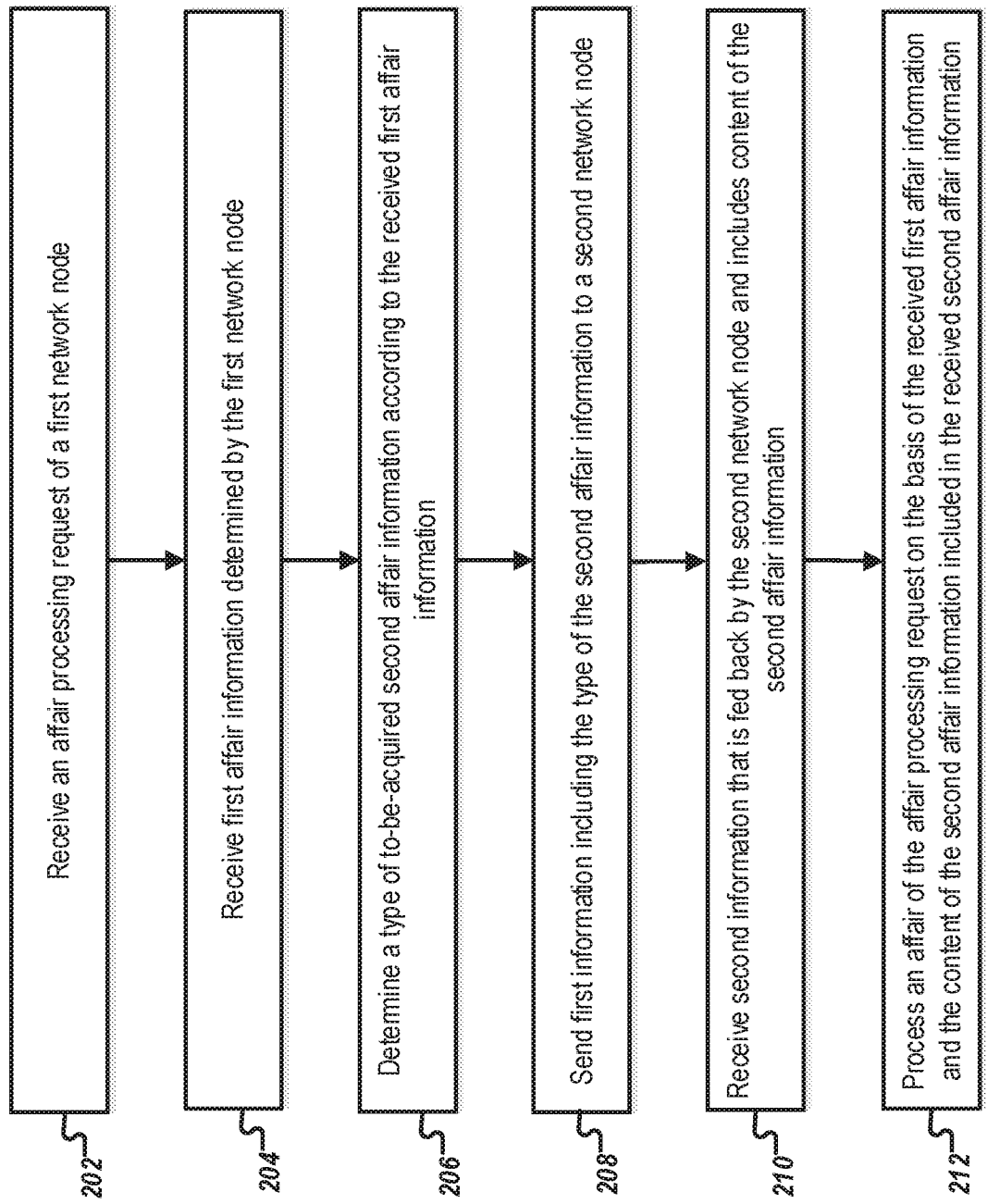
FIG. 2 is a flowchart illustrating an example of a computer-implemented method configured to process affair information from various nodes, according to an implementation of the present disclosure.

FIG. 2 is a flowchart illustrating an example of a computer-implemented method configured to process affair information from various nodes, according to an implementation of the present disclosure. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

At 202, a server receives an affair processing request from a first network node. In some implementations, the first network node may be a starting node that initiates a processing request during processing of a particular affair. In some implementations, the first network node includes a client terminal in which a user has logged in to a profile. In response to the first network node initiating the affair processing request, the server usually acquires several pieces of affair information corresponding to the affair processing request. This allows the server to perform an affair processing action according to the affair information, or send further instruction information to a related client terminal, such as the first network node.

In some implementations, an affair includes a type of the affair information and content of the affair information. For example, the type of a piece of affair information is color and the corresponding content is red, or the type of a piece of information is size, and the corresponding content is 260 millimeters.

In some implementations, the server may store in advance of use a mapping relationship table between IDs of affairs to be processed and several pieces of corresponding information. Each piece of affair information may include a type and content. In this instance, after the servers receives the affair processing request initiated by and from the first network node, the server may acquire an ID of the affair to be processed. In order to acquire an ID of the affair to be processed, the server may query, by using a pre-stored mapping relationship table and types of affair information for completing the affair. In a practical scenario, the content of each piece of affair information usually needs to be acquired from a corresponding network node, such as a first network node. In other implementations, the server may be configured to pre-store multiple options of content of a certain piece of affair information (for example, where the type of a piece of affair information is color, the corresponding content of red or some other color(s) can be pre-stored).

In some implementations, the affair corresponding to the affair processing request corresponds to at least the first network node that initiated the affair processing request and a second network node. Because the first network node and the second network node may have different characteristics or functions, the affair information corresponding to the affair may be classified into two different types of information. For example, the first network node includes a gift-giving individual and the second network node includes a gift-receiving individual. The different characteristics or functions include steps performed by each individual at a respective network node to either transmit the gift or receive the gift. The individual at the first network node may select the gift to transmit. The individual at the second network node may select the specification of a type of gift to receive.

In this implementation, the affair processing request initiated by the first network node may carry corresponding parameter information to the server. The server may determine multiple processed affairs that have yet to be processed from the received parameter information. In this instance, a user logging into the first network node can select an affair to be processed (for example, using a graphical user interface (GUI)).

In some implementations, the first network node and the second network node correspond to one another. The correspondence may be an association in the form of a friend relation on a same network interaction platform, or an association implemented in a same communication group on a same IM APP, or an association in the form of a friend relation on a same IM APP. For example, the first and second network nodes may be two user accounts on a social network platform such as FACEBOOK, and the two accounts have a friend relationship. In another example, the first and second network nodes may be two user accounts in a communication group on an IM APP, such as WHATSAPP, where the two user accounts may have a friend relation or may have no friend relation.

Other alternatives for the first network node and the second network node are possible. In some implementations, the first network node and the second network node may also be two user accounts not associated with each other, or even may be two user accounts on different network interaction platforms. For example, user A may use FACEBOOK chat to communicate with user B over IMES SAGE. From 202, method 200 proceeds to 204.

At 204, the server receives first affair information from the first network node. In some implementations, after the first network node initiates the affair processing request, the server may send information including the type of the to-be-acquired first affair information. In some implementations, a user may provide first affair information after logging on to the first network node. For instance, a client terminal logging on to the first network node can transmit, to the server, content of the first affair information determined by the first network node. In addition, the first network node may also select types of affair information suitable to be determined by the first network node while initiating the affair processing, and correspondingly determine content of the various types of affair information. For example, the content of the affair information can include a rule for the server to retrieve a gift that meet the requirements of first affair information and second affair information, such as being an electronic product, include a red color exterior, and does not cost more than $100 to purchase. As a result, the server can return gifts that meet these the requirements of the first and second affair information to the first network node for user selection. From 204, method 200 proceeds to 206.

At 206, the server determines a type of to-be-acquired second affair information according to the received first affair information. Each affair processed by the server includes second affair information. In some implementations, the first affair information and the second affair information represent two different types of information. For instance, after the server receives an affair processing request, the server may first determine a set of to-be-acquired affair information corresponding to the affair to be processed, where the set includes all affair information to be acquired. For example, an affair information set corresponding to an affair to be processed is information 1, information 2, information 3, information 4, where the type of the information 1 is, for example, color; the type of the information 2 is, for example, size; the type of the information 3 is, for example, model; the type of the information 4 is, for example, quantity.

In some implementations, the server determines the type of the to-be-acquired second affair information according to the first affair information received from the first network node. In an example, assuming the first affair information includes information 3 and information 4, the content of information 3 is model A, and the content of the information 4 is a quantity of five. For example, if the server retrieves a phone gift, the information 1 can include the brand of the phone, the information 2 can be the color of the phone, the information 3 can be the phone model, and the information 4 can be the carrier of the phone. In response, the server may determine the second affair information which the affair to be processed still lacks information 1 and information 2 because the received first information includes information 3 and information 4. As a result, the server may determine that the types of the to-be-acquired second affair information are color and size, respectively. From 206, method 200 proceeds to 208.

At 208, the server sends the first information including the type of the second affair information to a second network node. For instance, in general cases, users logging on to the first network node typically do not need to know the second affair information of a user logging on to the second network node. As a result, the to-be-acquired second affair information is suitable to be provided by the user of the second network node.

Therefore, the server sends the first information including the type of the second affair information to the second network node, so that the user logging on to the second network node determines content of the second affair information. For instance, the first information may include basic information of the affair to be processed, for example, initiation date, theme of the affair, and information of the first network node (or user) initiating the affair processing request. The first information may further include the first affair information already determined by the first network node. Using the available first information, the content of the second affair information can be determined. From 208, method 200 proceeds to 210.

At 210, the server receives second information that is fed back by the second network node and includes content of the second affair information. In some implementations, the types of the second affair information included in the transmitted first information include color and size. For instance, the content of the second affair information received by the server may the color red and a size of 260 millimeters.

In some implementations, the server acquires address information corresponding to the second network node corresponding to the first network node. This address information may be address information filled in by the user interacting with the second network node during user account registration. Alternatively, the address information may be acquired by means of a positioning technology, such as a global positioning system. From 210, method 200 proceeds to 212.

At 212, the server processes an affair of the affair processing request on the basis of the received first affair information and the content of the second affair information included in the received second affair information. For instance, the server may receive the first affair information from the first network node and the second affair information from the second network node. In addition, the server may complete the subsequent affair processing action utilizing both the first affair information and the second affair information. For example, the types of the affair information corresponding to the affair to be processed include color, size, model, and quantity respectively. In addition, the content corresponding to the affair information includes the color red, a size of 260 mm, a model A, and a quantity of five, respectively. In some implementations, the server processes the affair of the affair processing request on the basis of the determined first affair information, the content of the second affair information included in the received second information, and the acquired address information.

The following example illustrates an exemplary application scenario corresponding to an embodiment of FIG. 2. For instance, a server may receive a request of a user at a first network node transmitting a gift to a second network node. In response to receiving the gift request from the user, the server transmits a commodity information page to a client terminal logging on to the first network node. The server transmits the commodity information page according to parameter information carried received in the request. For example, parameter information may include a gift for a woman, a shopping item, or a gift for a man. Examples of the commodity information interface may include a webpage of women products, a webpage of men's clothing items, or a webpage of gifts for men.

At the first network node, the user may select women's shoes or men's shoes as a gift on the commodity information page. In response, the server receives first commodity information about the selected women's shoes or men's shoes. For instance, the server may receive a brand of the shoe, and a number of shoe items selected by the user on the first commodity information page. In response to the server receiving the first commodity information, the server determines that the first commodity information lacks one or more types of lacked second commodity information. For example, the lacked second commodity information may include women's shoe color and women's shoe size.

In some implementations, the server transmits the lacked second commodity information to the second network node in response to determining that the first commodity information lacks one or more types of lacked second commodity information. Subsequently, the second network node will receive the lacked second commodity information. In response, the second network node will feed the content of the lacked second commodity information back to the server. For instance, the lacked second commodity information may include women's shoe color and women's shoe size. The second network node may feed the color red and a size of 260 mm back to the server. As a result, the server completes generating the first-sending order information. In response, the server acquires all of the generated data and pushes the information to the first network node, so that the user of the first network node completes the order payment for the gift. In an alternative scenario, the user interacting with the second network node may complete the order payment. In another scenario, both the first network node and the second network node may cooperatively complete the order payment.

In addition, when the server generates the gift-sending order, the server sets address information of the user located at the second network node as a logistic address of the placed order. The server sets the second network node as the logistic address of the order because the recipient of the gift is the user located at the second network node. This ensures the gift is properly delivered to the recipient. In a specific application scenario of the present application, if the user located at the first network node is friends with the user located at the second network node, the first network node may send a "gift sending" request to the server by using an IM APP, such as FACEBOOK or WHATSAPP. In response, the server transmits a message including a type of to-be-determined second commodity information to the second network node. For instance, the type of to-be-determined second commodity information may include the information lacking from the gift-sending order. In response, the second network node feeds the message including content of the second commodity information back to the server. The server then generates a "gift sending" order according to determined content for each piece of commodity information.

Figure 3:
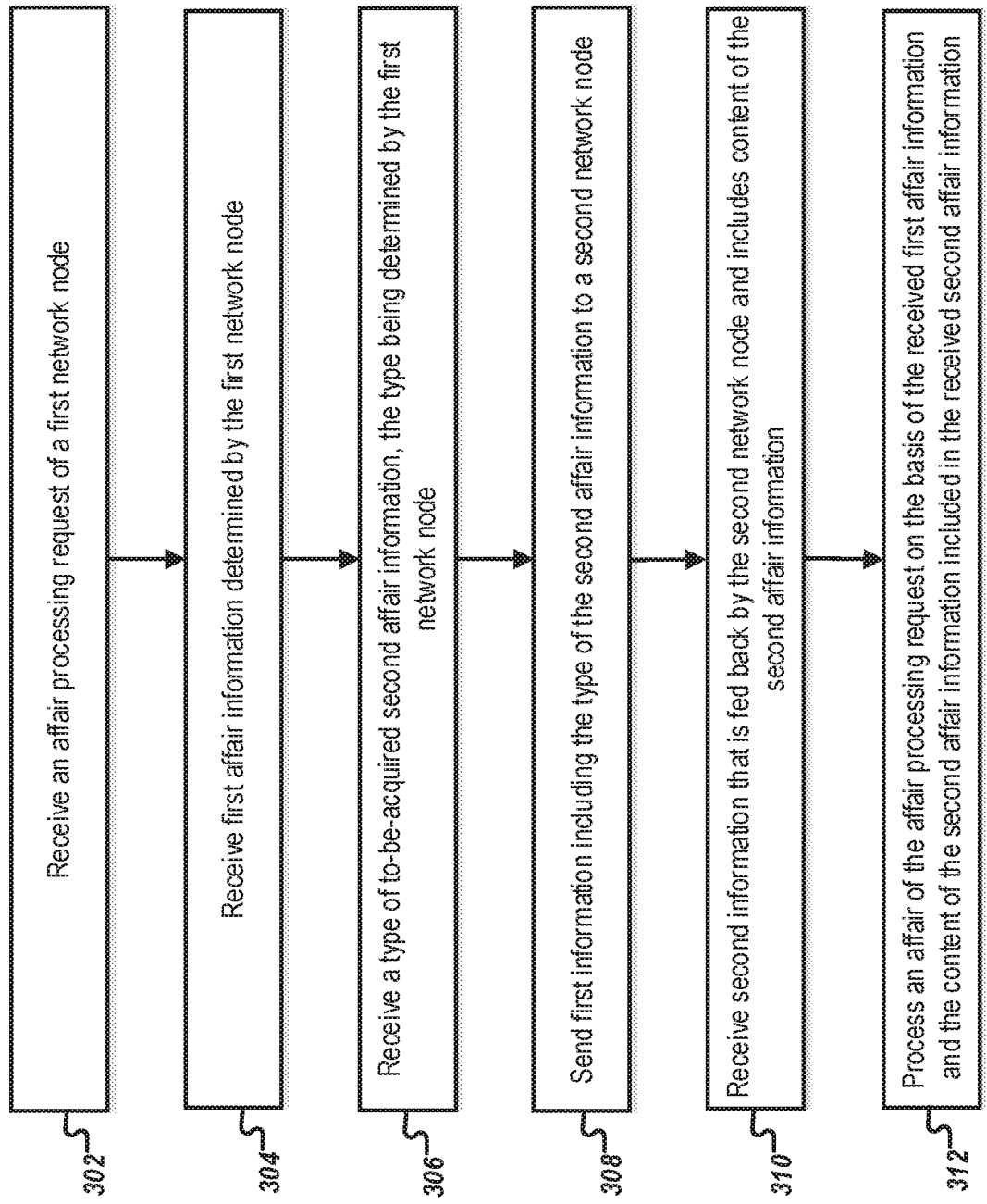
FIG. 3 is another flowchart illustrating an example of a computer-implemented method configured to process affair information from various nodes, according to an implementation of the present disclosure.

FIG. 3 is a flowchart illustrating an example of a computer-implemented method configured to process affair information from various nodes, according to an implementation of the present disclosure. For clarity of presentation, the description that follows generally describes method 300 in the context of the other figures in this description. However, it will be understood that method 300 can be performed, for example, by any system, environment, software, and hardware, or a combination of systems, environments, software, and hardware, as appropriate. In some implementations, various steps of method 300 can be run in parallel, in combination, in loops, or in any order.

At 302, the server receives an affair processing request from a first network node. 302 is similar to 202. From 302, method 300 proceeds to 304.

At 304, the server receives first affair information from the first network node. 304 is similar to 304. From 304, method 300 proceeds to 306.

At 306, the server receives a type of the to-be-acquired second affair information. For instance, the first network node determines the type of the to-be-acquired second affair information. The first network node determines the type of the to-be-acquired second affair information in the same manner the server determines the type of the to-be-acquired second affair information in 206.

In some implementations, the first network node initiates the affair processing request to determine the type of the second affair information. For instance, an affair information set corresponding to an affair to be processed includes information 1, information 2, information 3, and information 4. In this example, information 1 correspond to a color, information 2 corresponds to a size, information 3 corresponds to a model type, and information 4 corresponds to a quantity type. During actual processing, a user logs on to the first network node and may not know some affair information such as the information 1 corresponding to a user logging on to the second network node. In addition, the first affair information that can be determined by the user logging on to the first network node includes information 2, information 3, and information 4. As a result, the first network node determines that the type of the to-be-acquired second affair information is a color. The first network node provides the to-be-acquired second affair information to the server. The server then transmits the first information including the type of each information to the second network node, such that the user logging onto the second network node provides the content for the to-be-acquired second affair information of color. From 306, method 300 proceeds to 308.

At 308, the server sends the first information including the type of the second affair information to a second network node. 308 is similar to 208. From 308, method 300 proceeds to 310.

At 310, the server receives second information that is fed back by the second network node and includes content of the second affair information. From 310, method 300 proceeds to 312.

At 312, the server processes an affair of the affair processing request on the basis of the received first affair information and the content of the second affair information included in the received second affair information. 312 is similar to 212. After 312, method 300 stops.

Figure 4:
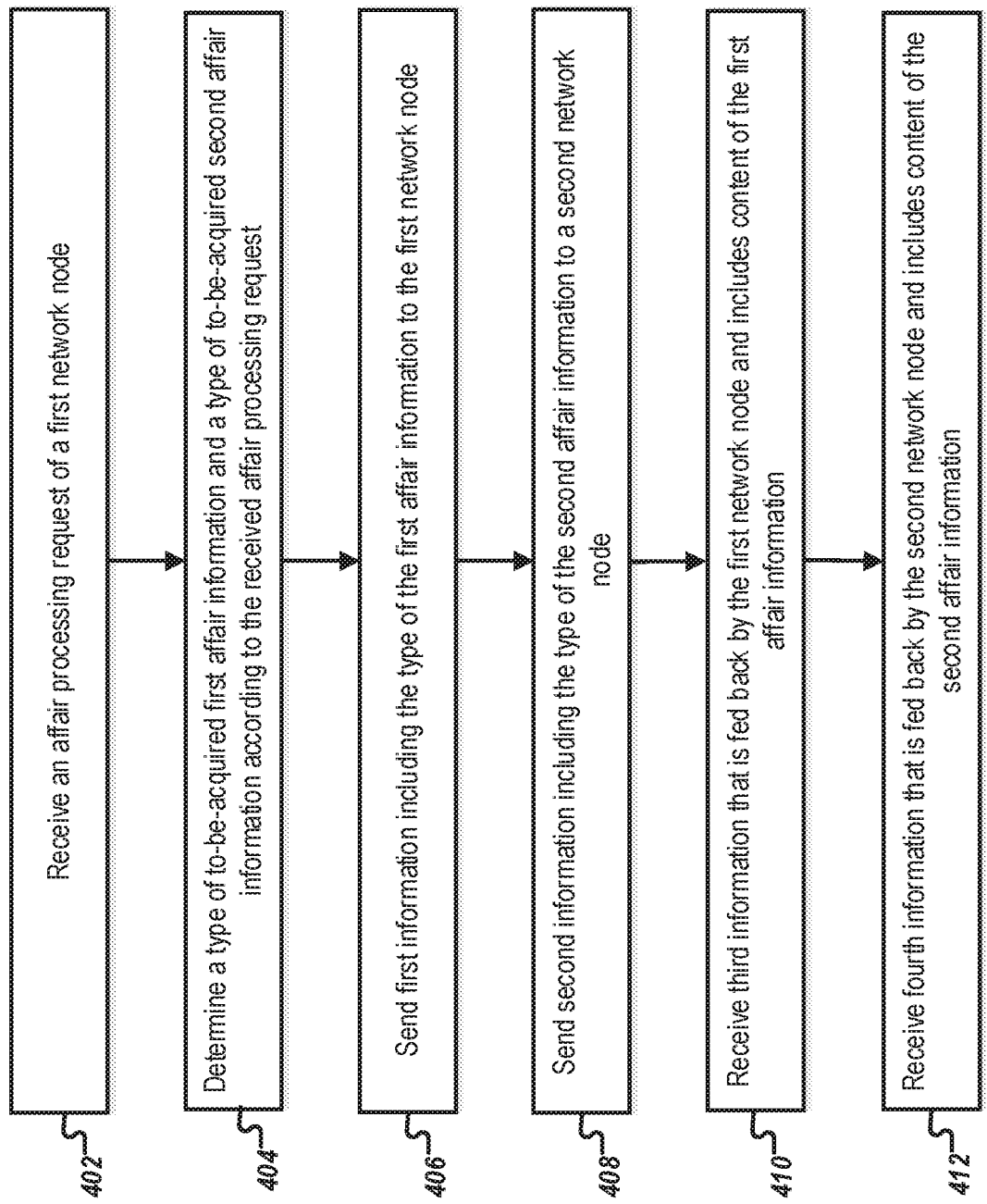
FIG. 4 is another flowchart illustrating an example of a computer-implemented method configured to process affair information from various nodes, according to an implementation of the present disclosure.

FIG. 4 is a flowchart illustrating an example of a computer-implemented method configured to process affair information from various nodes, according to an implementation of the present disclosure. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

At 402, the server receives an affair processing request from a first network node. 402 is similar to 302. From 402, method 400 proceeds to 404.

At 404, the server determines a type of to-be-acquired first affair information and a type of to-be-acquired second affair information according to the received affair processing request from the first network node. From 404, method 400 proceeds to 406.

At 406, the server sends the first information including the type of the first affair information to a first network node. From 406, method 400 proceeds to 408.

At 408, the server sends second information including the type of the second affair information to a second network node. From 408, method 400 proceeds to 410.

At 410, the server receives third information that is fed back by the first network node and includes content of the first affair information. From 410, method 400 proceeds to 412.

At 412, the server receives fourth information that is fed back by the second network node and includes content of the second affair information. After 412, method 400 stops.

In some implementations, after the server receives the affair processing request information initiated by the first network node, the server may determine, according to the received affair processing request information, the type of the to-be-acquired first affair information and the type of the to-be-acquired second affair information. For example, the server may determine, according to the affair processing request, the to-be-acquired first affair information includes women's shoe size and the to-be-acquired second affair information includes a man's shoe color.

In some implementations, after the server acquires all affair information corresponding to the affair to be processed, the server determines which affair information belongs to the first affair information suitable to be provided by the first network node and which affair information belongs to the second affair information suitable to be provided by the second network node. In order to implement this system, the server utilizes an information classification table corresponding to various types of affair processing requests pre-stored on the server. For instance, after the server receives an affair processing request, the server may query the information classification table to obtain information included in the first affair information corresponding to the affair processing request and the information included in the second affair information corresponding to the affair processing request.

In some implementations, the affair information set corresponding to an affair to be processed includes information 1, information 2, information 3, and information 4. For example, the type of information 1 includes the color of the shoe; information 2 includes the type of the shoe; information 3 includes the model of the shoe; and, information 4 includes the quantity amount of the shoe being purchased. When the server queries the classification table for the foregoing information, the server may obtain first affair information including information 3 and information 4 and obtain second affair information including information 1 and information 2. Finally, the server transmits the types of the first affair information to the first network node and transmits the types of the second affair information to the second network node. In this manner, both the first network node and the second network node separately feed the content of the first affair information back to the server.

Continuing with the previous example of sending a gift to a second network node initiated by a first network node, the server transmits a commodity information page to a client terminal logging on to the first network node. The server selects the commodity information page according to parameter information, such as a gift for a woman, carried in the request. For instance, the user logged on to the client terminal at the first node may select women's shoes as gift displayed on the commodity information interface or webpage. Afterwards, the server may query the pre-stored information in the classification table to obtain types of first commodity information. The first commodity information queried from the classification table may include first commodity information such as women's shoe brand and women's shoe quantity. Additionally, the classification table may include second commodity information such as women's shoe color and women's shoe size. Next, the server transmits the acquired types of the first commodity information to the first network node and the second commodity information to the second network node. As a result, the server may receive the content of the first commodity information fed back by the first network node and the content of the second commodity information fed back by the second network node. For instance, the content of the first commodity information may include the shoe brand of NIKE and a shoe quantity of 2. The content of the second commodity information may include the color of the shoe brand as red and a shoe size of 260 mm. Generally, the gift-sending order information may be generated according to the commodity information, and the order information is pushed to the first network node so the user logged on to the client terminal of the first network node completes order payments.

Figure 5:
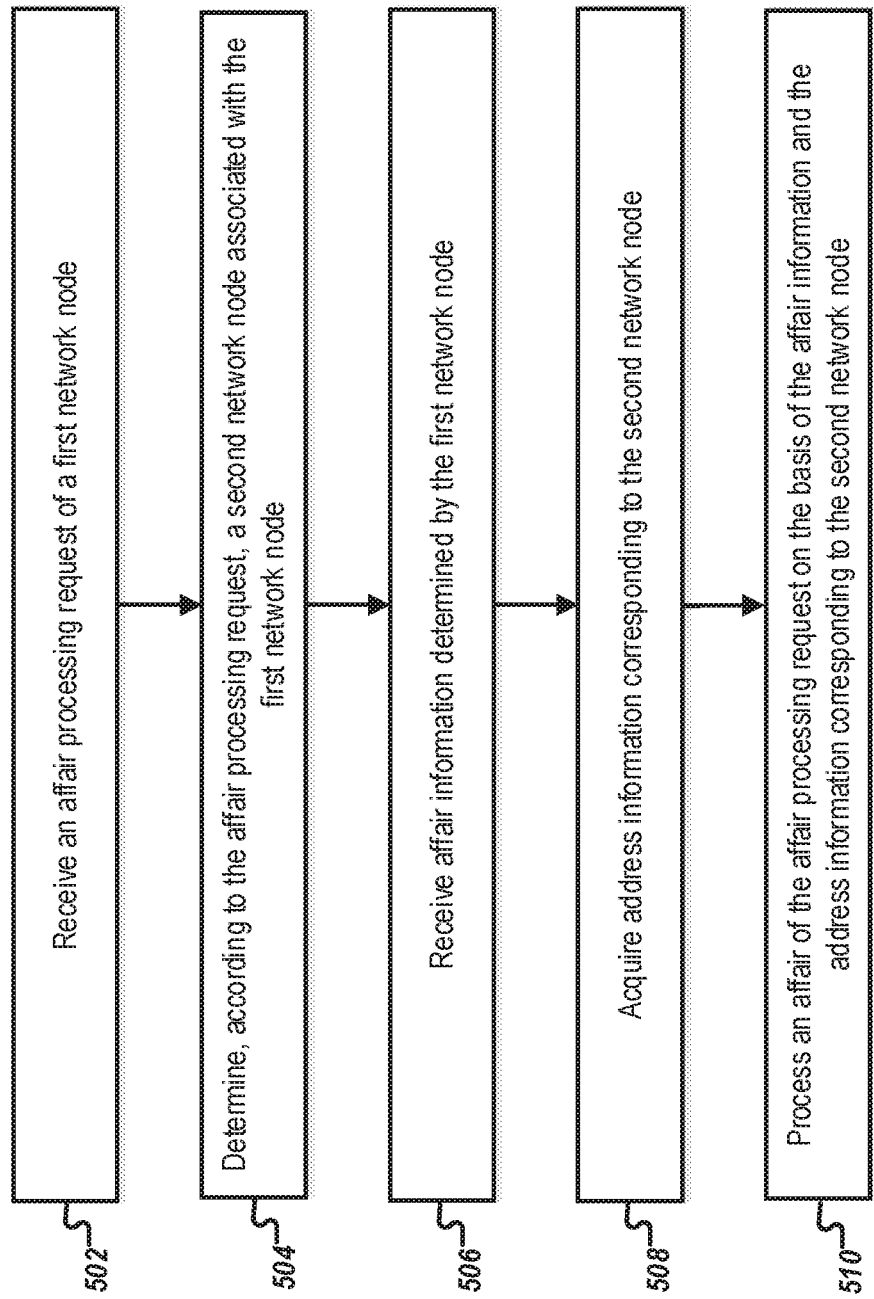
FIG. 5 is another flowchart illustrating an example of a computer-implemented method configured to process affair information from various nodes, according to an implementation of the present disclosure.

FIG. 5 is a flowchart illustrating an example of a computer-implemented method configured to process affair information from various nodes, according to an implementation of the present disclosure. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order.

At 502, the server receives an affair processing request from a first network node. 502 is similar to 402. From 502, method 500 proceeds to 504.

At 504, the server determines, according to the affair processing request, a second network node associated with the first network node. From 504, method 500 proceeds to 506.

At 506, the server receives affair information determined by the first network node. 506 is similar to 304. From 506, method 500 proceeds to 508.

At 508, the server acquires address information corresponding to the second network node. For instance, the server acquires address information using a positioning coordinate system internal to the server. From 508, method 500 proceeds to 510.

At 510, the server processes an affair of the affair processing request on the basis of the affair information and the address information corresponding to the second network node. 510 is similar to 312. After 510, method 500 stops.

In some implementations, after the server receives the affair processing request, the server may acquire related affair information from the first network node. The related affair information may be acquired in the following manner: for instance, the first network node actively sends the affair information, or a corresponding information prompt (a message including a type of affair information that needs to be acquired) is transmitted to the first network node. In addition, the server may further query address information from the second network node. The address information may be address information filled by a user logged on a client terminal at the second network node during user account registration. Alternatively, the address information may be location information of the second network node obtained by using a positioning technology, such as a global positioning system device. Finally, the server processes the affair according to the affair information obtained from the first network node and the address information of the second network node.

In some implementations, a server receives a request of sending a gift to a second network node initiated by a first network node. For instance, the server transmits a commodity information page corresponding to the client terminal logging on to the first network node. The server transmits the commodity information page according to parameter information carried in the request received by the server. Parameter information may include characteristics describing a gift for a woman, such as a woman's shoe. The commodity information page may include a commodity information interface of women products. For instance, the user logged on to the client terminal of the first network node may select women's shoes on the commodity information interface as a gift.

In response to the selection, the server transmits types of commodity information to the first network node that is required for placement of the shoe order. For instance, the types may include women's shoe brand, women's shoe quantity, women's shoe color, and women's shoe size. Once the user enters the women's shoe brand, the women's shoe quantity, the women's shoe color, and the women's shoe size such as NIKE, 2, red, and 260 mm, respectively, the first network node may transmit this information to the server. In response, the server may query a database to obtain address information of a gift recipient. The address information may include a house number, a street number, a country, a city, a state, and a zip code information. Once the server obtains this address information, the server transmits the address information and the acquired order information to the first network node, such that the user logged on to the client terminal of the first network node completes the order payment. In some implementations, when the server generates the gift-sending order, the server may set the address information to the user logged on the client terminal at the second network node as a logistic address of the order because that user is the recipient of the gift.

In some implementations, the user logged on to a client terminal at the first network node and the user logged on to a client terminal at the second network node may be two friends communicating over on an IM APP. For example, the IM APP may be FACEBOOK's chat messenger or WHATSAPP. In some implementations, the first network node and the second network node may complete the affair processing during a conversation between the two users logged on to client terminals at the respective network nodes. For instance, the method of the affair processing over an IM APP includes the following: first, the server receives an affair processing request sent by the first network node through the IM APP. In response, the server generates affair information corresponding to the affair processing request. For example, assume user A of the first network node and user B of the second network node are friends communicating in an IM APP. In this instance, the affair processing request includes a gift-sending request. User A located at the first network node may initiate the gift sending request by triggering a gift sending button located on a chatting interface of the IM APP on the client terminal. In response, the server transmits a gift-sending interface to user A, and user A may select a gift such as clothes or shoes in the gift-sending interface, and generates affair information, such as gift sending information. Specifically, the gift-sending information may include a type of to-be-determined information. For example, the to-be-determined information may include the characteristics of the gifts, such as the size of the clothes, the color of the clothes, the quantity of the clothes, and the brand of the clothes. Content of a part of information in the gift-sending information may be determined by user A located at the first network node. User B of the second network node may determine the other part of information. For instance, user A and user B may insert the content of the part of information at the client terminal of each respective network node.

In some implementations, the server transmits the generated affair information to the second network node corresponding with the first network node. For instance, the generated affair information including type(s) of one or more pieces of to-be-determined information, as mentioned previously. The server transmits the type of the to-be-determined information in the generated affair information to the second network node. For example, after the second network node receives the gift sending information, user B of the second network node may open a gift-sending interface on the client terminal corresponding to the gift sending information. The user B may view the types of one or more pieces of to-be-determined information in the gift-sending interface—for example, the color, size, and the quantity of the gift. Once user B receives the gift at client terminal of the second network node, user B can decide whether to accept the received gift or not. If user B decides to accept the gift, user B needs to determine the content of the to-be-determined information. For example, user B may input into the instant messaging chat application that the clothes color is red, and the size of the clothes is a large.

In some implementations, the server receives the content of the to-be-determined information sent by user B at the second network node. In response to receiving the content, the server processes an affair of the affair processing request according to the content of the to-be-determined information. For example, the affair processing request may be a gift-sending request over an IM APP.

In some implementations, the server may generate a gift sending order after receiving the content of the to-be-determined information fed back to the server by user B of the second network node through the IM APP. For instance, a gift provider may perform operations such as deduction and delivery based on the order.

In some implementations, a separate server may generate a gift-sending interface to display on the client terminals of the first network node and the second network node. The gift-sending interface may be associated with the IM APP. In some implementations, the server utilizing the IM APP and the separate server may be the same server. The separate server, such as a server included in a grocery store or a merchandising store, may implement operations such as purchasing goods, purchasing gifts, generating an order, and generating payment. The separate server and the server utilizing the IM APP may be configured to work in tandem with one another to perform the affair processing request, such as the gift-giving request, over the IM APP. For example, the server utilizing the IM APP may perform the sending and receiving of the request, and the order generation of goods may be implemented in the separate server.

In some implementations, a network architecture where the first network node and the second network node are located may implement the operations of the affair processing request. Alternatively, the network architecture may independent implement all of the previously mentioned method steps. For example, part of the affair processing request may be assigned to another system for processing, or may be processed by invoking another system architecture.

In some implementations, the method can be implemented in a network shopping platform architecture. Two or more users utilizing the platform may cooperate with one another to process one affair, such as processing a gift-giving request. For instance, assuming user A on the network platform purchases a commodity such as clothes. After user A selects the the clothes, user A may send the selected clothes information to user B. Once user B receives the selected clothes information, user B can modify attributes of the selected clothes information such as the color and size of the clothes. Once user B modifies the attribute of the selected clothes information, the platform may generate a shopping order for user A. User A or user B may create payment of the order. Additionally, both user A and user B may jointly create payment information for the order.

Figure 6:
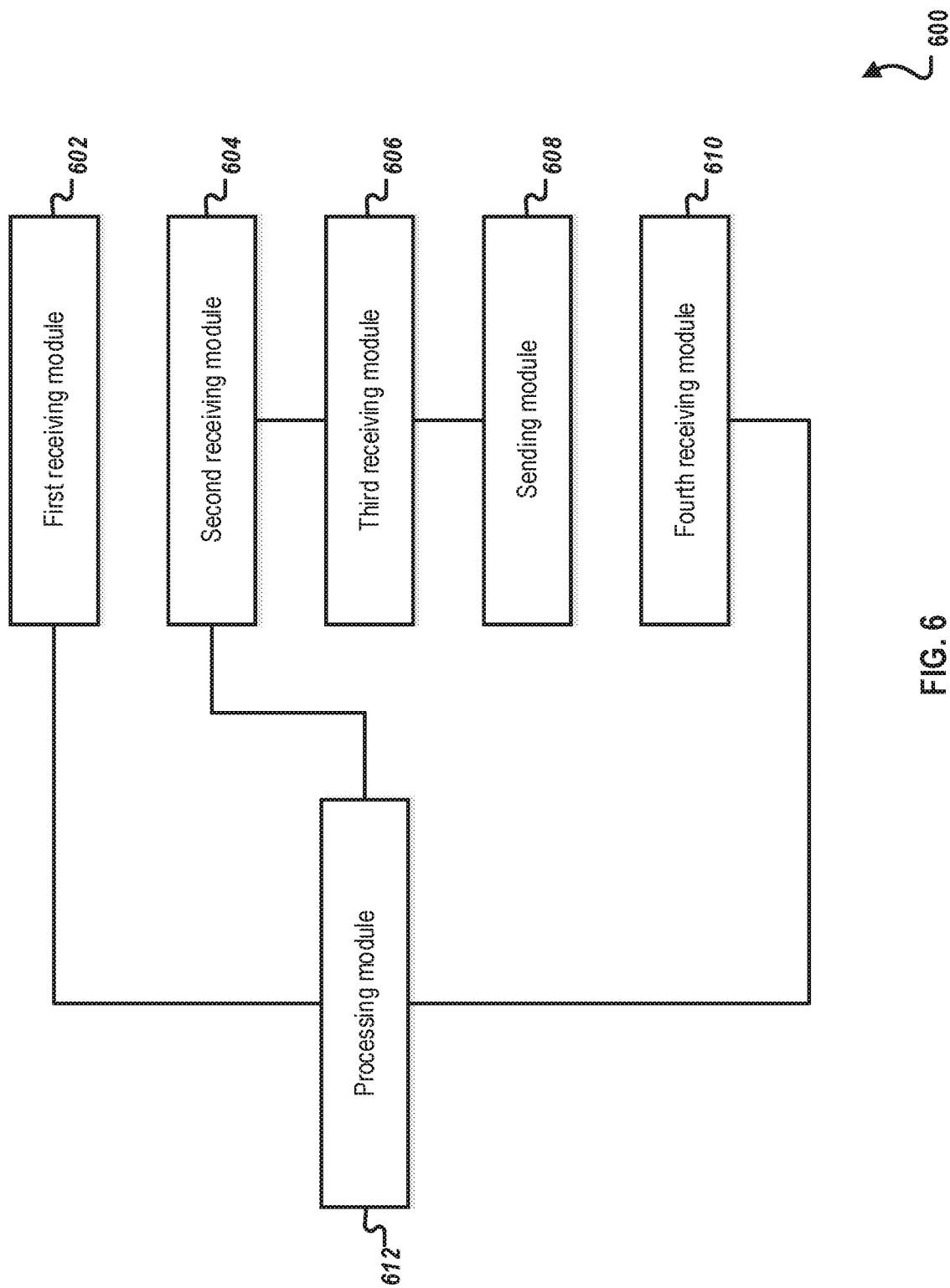
FIG. 6 is another block diagram illustrating an example of a computer-implemented system configured to process affair information from various nodes, according to an implementation of the present disclosure.

FIG. 6 is a block diagram illustrating an example of a computer-implemented system 600 configured to process affair information from various nodes, according to an implementation of the present disclosure.

In some implementations, system 600 includes a first receiving module 602, a second receiving module 604, a first determination module 606, a sending module 608, a third receiving module 610, and a processing module 612. The first receiving module 602 connects to the processing module 612. The second receiving module 604 connects to the processing module 612 and the first determination module 606. The first determination module 606 connects to the second receiving module 604 and the sending module 608. The sending module 608 connects to the first determination module 606. The third receiving module 610 connects to the processing module 612. The processing module 612 connects to the first receiving module 602, the second receiving module 604 and the third receiving module 610.

In some implementations, each of the modules are configured to perform various functions. For instance, the first receiving module 602 is configured to receive an affair processing request of a first network node. The second receiving module 604 is configured to receive first affair information determined by the first network node. The first determination module 606 is configured to determine a type of to-be-acquired second affair information according to the received first affair information. The sending module 608 is configured to send first information including the type of the second affair information to a second network node. The third receiving module 610 is configured to receive second information that is fed back by the second network node and includes content of the second affair information. The processing module 612 is configured to process an affair of the affair processing request based on the received first affair information and the content of the second affair information included in the received second information.

Figure 7:
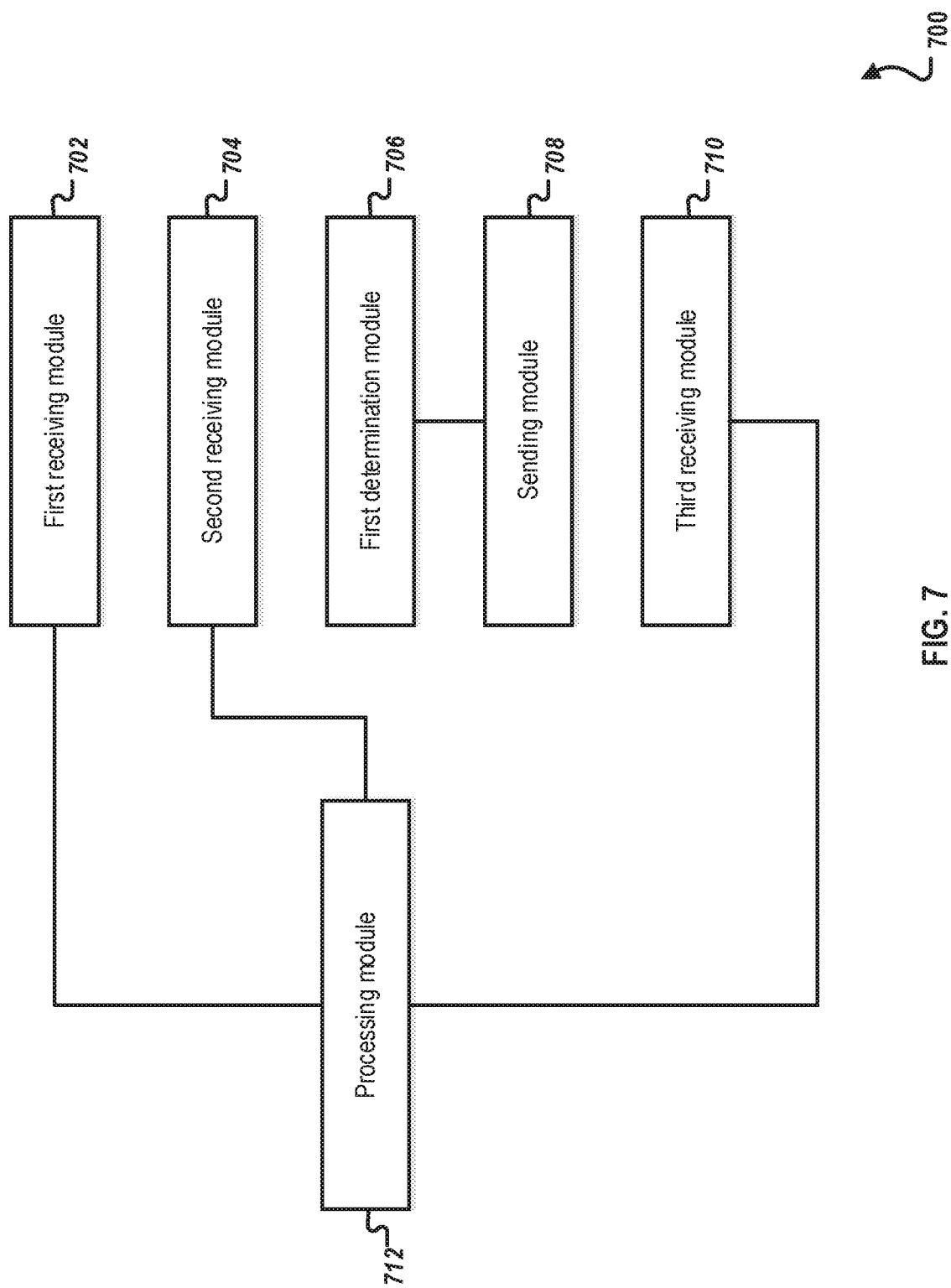
FIG. 7 is another block diagram illustrating an example of a computer-implemented system configured to process affair information from various nodes, according to an implementation of the present disclosure.

FIG. 7 is a block diagram illustrating an example of a computer-implemented system 700 configured to process affair information from various nodes, according to an implementation of the present disclosure.

In some implementations, system 700 includes similar components to system 600. However, in system 700, the second receiving module 704 only connects to the processing module 712.

Figure 8:
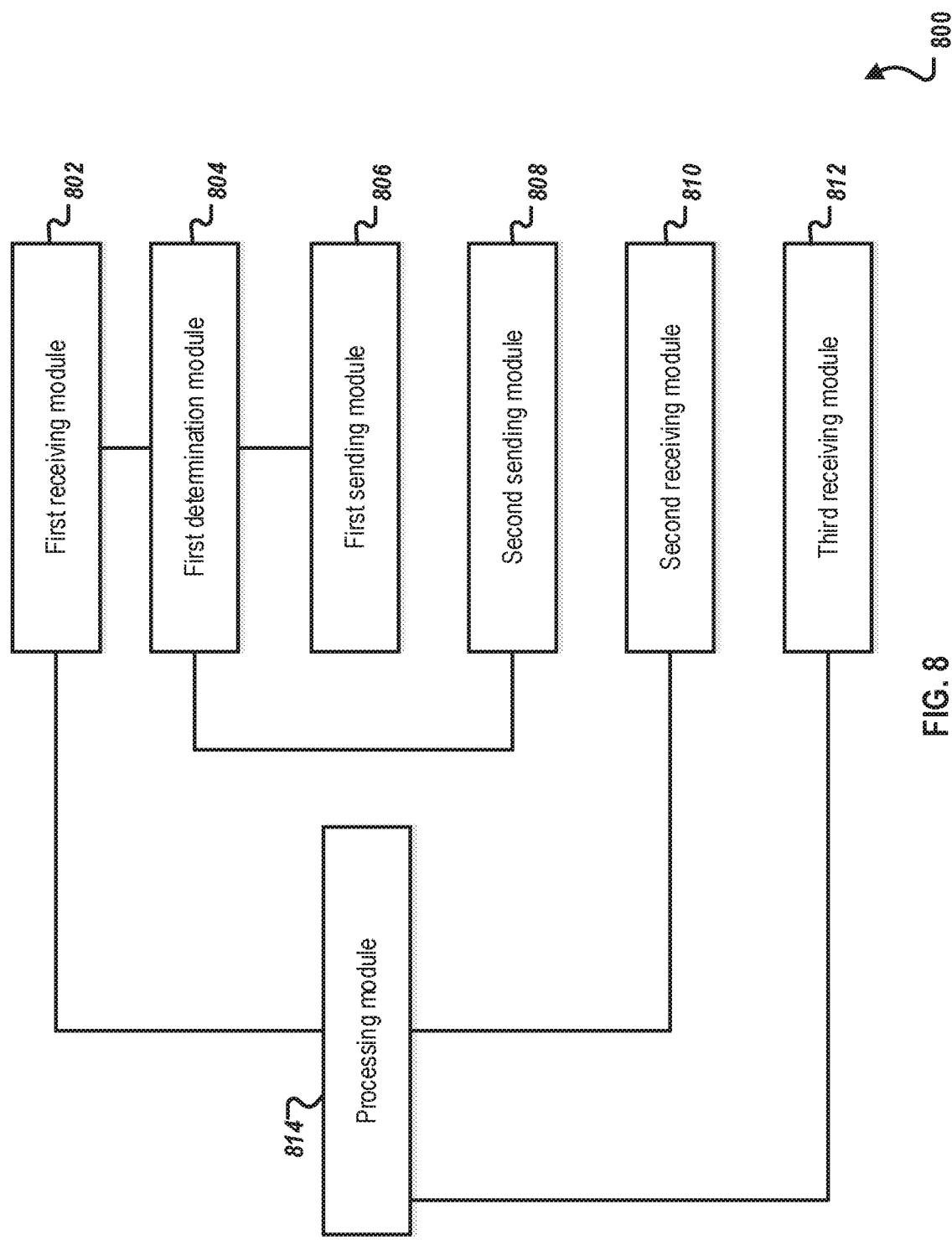
FIG. 8 is another block diagram illustrating an example of a computer-implemented system configured to process affair information from various nodes, according to an implementation of the present disclosure.

FIG. 8 is a block diagram illustrating an example of a computer-implemented system 800 configured to process affair information from various nodes, according to an implementation of the present disclosure.

In some implementations, system 800 includes a first receiving module 802, a first determination module 804, a first sending module 806, a second sending module 808, a second receiving module 810, a third receiving module 812, and a processing module 814. The first receiving module 802 connects to the first determination module 804 and the processing module 814. The first determination module 804 connects to the first receiving module 802, the first sending module 806, and the second sending module 808. The first sending module 806 connects to the first determination module 804. The second sending module 808 connects to the first determination module 804. The second receiving module 810 connects to the processing module 814. The third receiving module 812 connects to the processing module 814. The processing module 814 connects to the first receiving module 802, the second receiving module 810, and the third receiving module 812.

In some implementations, each of the modules are configured to perform various functions. For instance, the first receiving module 802 is configured to receive an affair processing request of a first network node. The first determination module 804 is configured to determine a type of to-be-acquired first affair information and a type of to-be-acquired second affair information according to the received affair processing request. The first sending module 806 is configured to send first information including the type of the first affair information to the first network node. The second sending module 808 is configured to send second information including the type of the second affair information to a second network node. The second receiving module 810 is configured to receive third information that is fed back by the first network node and includes content of the first affair information. The third receiving module 812 is configured to receive fourth information that is fed back by the second network node and includes content of the second affair information. The processing module 814 is configured to process an affair of the affair processing request based on the content of the first affair information included in the received third information and the content of the second affair information included in the received fourth information.

Figure 9:
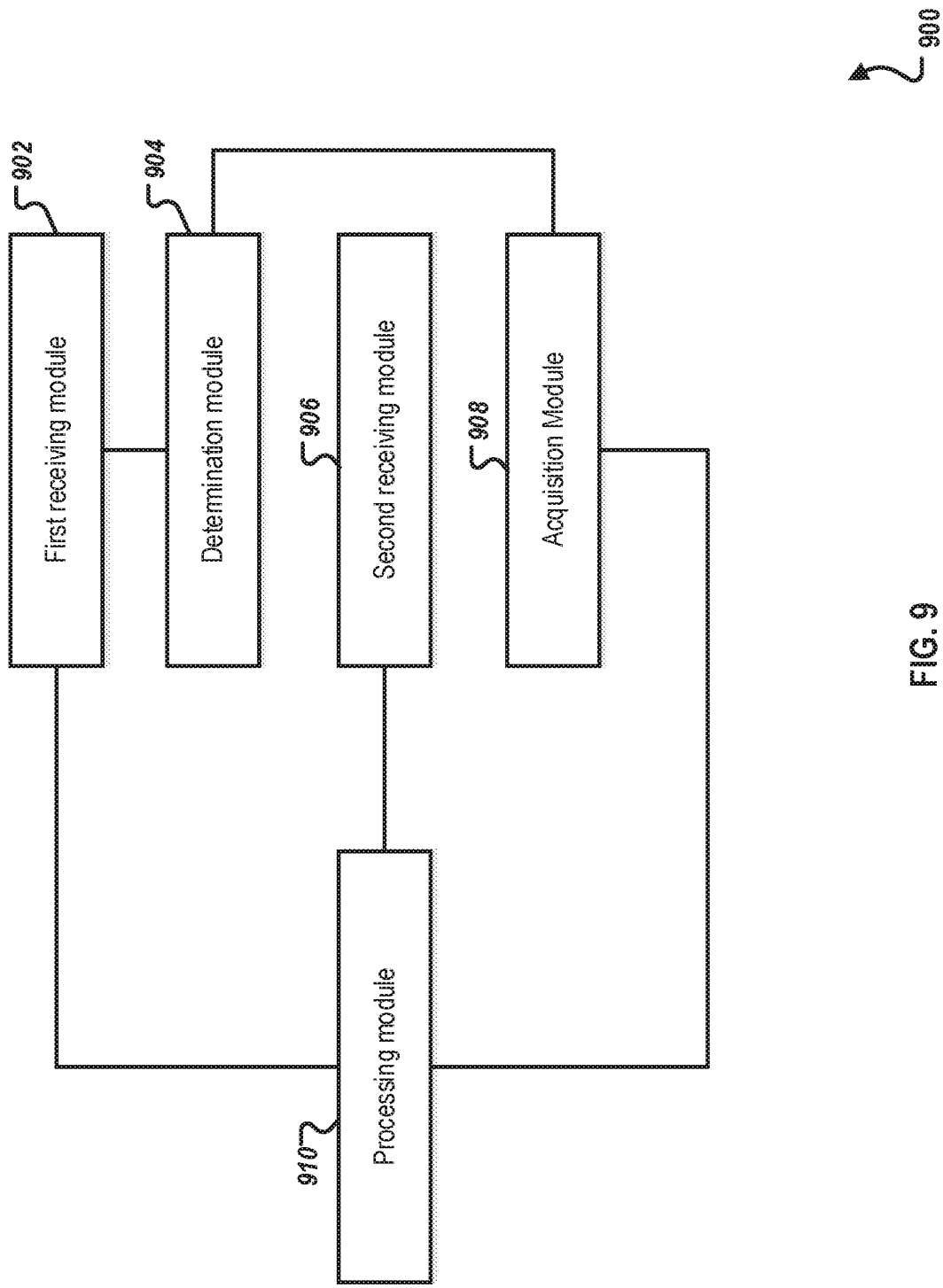
FIG. 9 is another block diagram illustrating an example of a computer-implemented system configured to process affair information from various nodes, according to an implementation of the present disclosure.

FIG. 9 is a block diagram illustrating an example of a computer-implemented system 900 configured to process affair information from various nodes, according to an implementation of the present disclosure.

In some implementations, system 900 includes a first receiving module 902, a determination module 904, a second receiving module 906, an acquisition module 908, and a processing module 910. The first receiving module 902 connects to the determination module 904 and the processing module 910. The determination module 904 connects to the first receiving module 902 and the acquisition module 908. The second receiving module 906 connects to the processing module 910. The acquisition module 908 connects to the processing module 910 and the determination module 904.

In some implementations, each of the components in system 900 performs various functions. For instance, the first receiving module 902 is configured to receive an affair processing request of a first network node. The determination module 804 is configured to determine, according to the affair processing request, a second network node associate with the first network node. The second receiving module 906 is configured to receive affair information determined by the first network node. The acquisition module 804 is configured to acquire address information corresponding to the second network node. For instance, the acquisition module 804 is configured to acquire address information by means of a positioning technology, such as a global positioning system. The processing module 910 is configured to process an affair of the affair processing request based on the received affair information and the acquired address information corresponding to the second network node.

It can be seen from the technical solutions of the affair processing device provided in the foregoing embodiments of the present application, during processing of an affair, first affair information determined by a first network node is received, and second affair information required for processing the affair to be processed is acquired from a second network node; finally, the first affair information and the second affair information acquired from the two network nodes respectively are combined, to complete the affair processing procedure. Compared with the technical solution of acquiring affair information from a single network node, the accuracy of the affair information acquired in the embodiments of the present application can be improved.

In some implementations, the method previously described alleviates the burden put on the server and reduces the loss of network resources utilized by the server. For instance, by transmitting information less frequently to the server, the server may be relied upon less, which removes the burden of process from the server and frees up any utilization in network resources.

In some implementations, other scenarios may be utilized by the previously described method. For instance, a first network node sends an affair request, such as a ticket-ordering request for a movie time, to a server. The second network node determines affair information corresponding to the ticket-ordering request. The affair information includes number of tickets to order, time of the movie showing, and a description of the movie showing.

Figure 10:
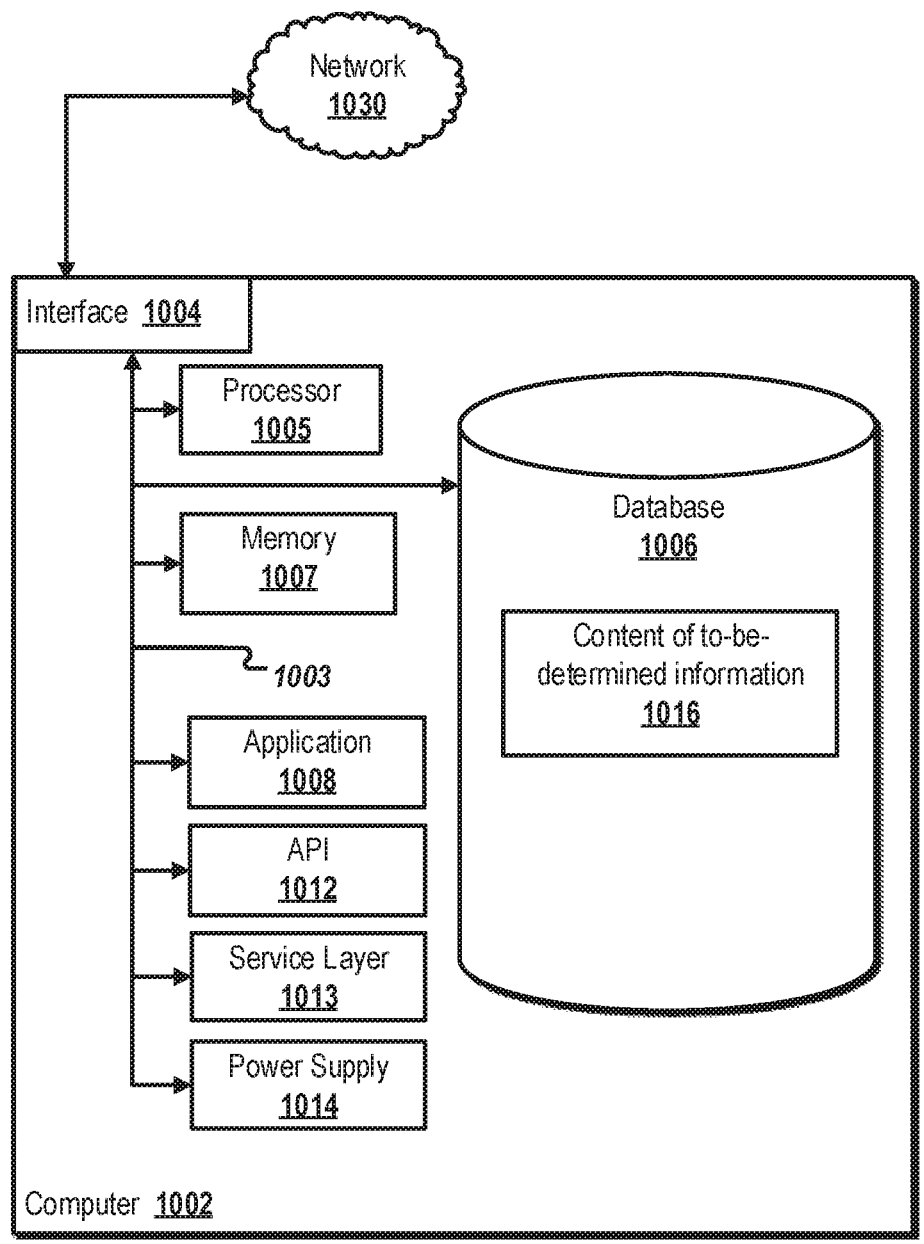
FIG. 10 is another block diagram illustrating an example of a computer-implemented system used to provide computational functionalities associated with described algorithms, methods, functions, processes, flows, and procedures, according to an implementation of the present disclosure.

FIG. 10 is a block diagram illustrating an example of a computer-implemented System 1000 used to provide computational functionalities associated with described algorithms, methods, functions, processes, flows, and procedures, according to an implementation of the present disclosure. In the illustrated implementation, System 1000 includes a Computer 1002 and a Network 1030.

The illustrated Computer 1002 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 1002 can include an input device, such as a keypad, keyboard, touch screen, another input device, or a combination of input devices that can accept user information, and an output device that conveys information associated with the operation of the Computer 1002, including digital data, visual, audio, another type of information, or a combination of types of information, on a graphical-type user interface (UI) (or GUI) or other UI.

The Computer 1002 can serve in a role in a distributed computing system as a client, network component, a server, a database or another persistency, another role, or a combination of roles for performing the subject matter described in the present disclosure. The illustrated Computer 1002 is communicably coupled with a Network 1030. In some implementations, one or more components of the Computer 1002 can be configured to operate within an environment, including cloud-computing-based, local, global, another environment, or a combination of environments.

At a high level, the Computer 1002 is an electronic computing device operable to receive, transmit, process, store, or manage data and information associated with the described subject matter. According to some implementations, the Computer 1002 can also include or be communicably coupled with a server, including an application server, e-mail server, web server, caching server, streaming data server, another server, or a combination of servers.

The Computer 1002 can receive requests over Network 1030 (for example, from a client software application executing on another Computer 1002) and respond to the received requests by processing the received requests using a software application or a combination of software applications. In addition, requests can also be sent to the Computer 1002 from internal users (for example, from a command console or by another internal access method), external or third-parties, or other entities, individuals, systems, or computers.

Each of the components of the Computer 1002 can communicate using a System Bus 1003. In some implementations, any or all of the components of the Computer 1002, including hardware, software, or a combination of hardware and software, can interface over the System Bus 1003 using an application programming interface (API) 1012, a Service Layer 1013, or a combination of the API 1012 and Service Layer 1013. The API 1012 can include specifications for routines, data structures, and object classes. The API 1012 can be either computer-language independent or dependent and refer to a complete interface, a single function, or even a set of APIs. The Service Layer 1013 provides software services to the Computer 1002 or other components (whether illustrated or not) that are communicably coupled to the Computer 1002. The functionality of the Computer 1002 can be accessible for all service consumers using the Service Layer 1013. Software services, such as those provided by the Service Layer 1013, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 1002, alternative implementations can illustrate the API 1012 or the Service Layer 1013 as stand-alone components in relation to other components of the Computer 1002 or other components (whether illustrated or not) that are communicably coupled to the Computer 1002. Moreover, any or all parts of the API 1012 or the Service Layer 1013 can be implemented as a child or a sub-module of another software module, enterprise application, or hardware module without departing from the scope of the present disclosure.

The Computer 1002 includes an Interface 1004. Although illustrated as a single Interface 1004, two or more Interfaces 1004 can be used according to particular needs, desires, or particular implementations of the Computer 1002. The Interface 1004 is used by the Computer 1002 for communicating with another computing system (whether illustrated or not) that is communicatively linked to the Network 1030 in a distributed environment. Generally, the Interface 1004 is operable to communicate with the Network 1030 and includes logic encoded in software, hardware, or a combination of software and hardware. More specifically, the Interface 1004 can include software supporting one or more communication protocols associated with communications such that the Network 1030 or hardware of Interface 1004 is operable to communicate physical signals within and outside of the illustrated Computer 1002.

The Computer 1002 includes a Processor 1005. Although illustrated as a single Processor 1005, two or more Processors 1005 can be used according to particular needs, desires, or particular implementations of the Computer 1002. Generally, the Processor 1005 executes instructions and manipulates data to perform the operations of the Computer 1002 and any algorithms, methods, functions, processes, flows, and procedures as described in the present disclosure.

The Computer 1002 also includes a Database 1006 that can hold data for the Computer 1002, another component communicatively linked to the Network 1030 (whether illustrated or not), or a combination of the Computer 1002 and another component. For example, Database 1006 can be an in-memory, conventional, or another type of database storing data consistent with the present disclosure. In some implementations, Database 1006 can be a combination of two or more different database types (for example, a hybrid in-memory and conventional database) according to particular needs, desires, or particular implementations of the Computer 1002 and the described functionality. Although illustrated as a single Database 1006, two or more databases of similar or differing types can be used according to particular needs, desires, or particular implementations of the Computer 1002 and the described functionality. While Database 1006 is illustrated as an integral component of the Computer 1002, in alternative implementations, Database 1006 can be external to the Computer 1002. As illustrated, the Database 1006 holds the content of the to-be-determined information 1016.

The Computer 1002 also includes a Memory 1007 that can hold data for the Computer 1002, another component or components communicatively linked to the Network 1030 (whether illustrated or not), or a combination of the Computer 1002 and another component. Memory 1007 can store any data consistent with the present disclosure. In some implementations, Memory 1007 can be a combination of two or more different types of memory (for example, a combination of semiconductor and magnetic storage) according to particular needs, desires, or particular implementations of the Computer 1002 and the described functionality. Although illustrated as a single Memory 1007, two or more Memories 1007 or similar or differing types can be used according to particular needs, desires, or particular implementations of the Computer 1002 and the described functionality. While Memory 1007 is illustrated as an integral component of the Computer 1002, in alternative implementations, Memory 1007 can be external to the Computer 1002.

The Application 1008 is an algorithmic software engine providing functionality according to particular needs, desires, or particular implementations of the Computer 1002, particularly with respect to functionality described in the present disclosure. For example, Application 1008 can serve as one or more components, modules, or applications. Further, although illustrated as a single Application 1008, the Application 1008 can be implemented as multiple Applications 1008 on the Computer 1002. In addition, although illustrated as integral to the Computer 1002, in alternative implementations, the Application 1008 can be external to the Computer 1002.

The Computer 1002 can also include a Power Supply 1014. The Power Supply 1014 can include a rechargeable or non-rechargeable battery that can be configured to be either user- or non-user-replaceable. In some implementations, the Power Supply 1014 can include power-conversion or management circuits (including recharging, standby, or another power management functionality). In some implementations, the Power Supply 1014 can include a power plug to allow the Computer 1002 to be plugged into a wall socket or another power source to, for example, power the Computer 1002 or recharge a rechargeable battery.

There can be any number of Computers 1002 associated with, or external to, a computer system containing Computer 1002, each Computer 1002 communicating over Network 1030. Further, the term "client," "user," or other appropriate terminology can be used interchangeably, as appropriate, without departing from the scope of the present disclosure. Moreover, the present disclosure contemplates that many users can use one Computer 1002, or that one user can use multiple computers 1002.

Described implementations of the subject matter can include one or more features, alone or in combination.

For example, in a first implementation, a computer-implemented method, comprising: receiving an affair processing request from a first network node; determining a type of to-be-acquired second affair information excluded from the received first affair information; transmitting first information comprising the type of the to-be-acquired second affair information to a second network node; receiving second information comprising content of the second affair information that is fed back by the second network node; and processing an affair of the affair processing request on the basis of the received first affair information and the received content of the second affair information.

The foregoing and other described implementations can each, optionally, include one or more of the following features:

A first feature, combinable with any of the following features, further comprising determining a correspondence between a first user logged on to a first client terminal at a first network node and a second user logged on to a second client terminal at a second network node.

A second feature, combinable with any of the previous or following features, wherein the correspondence includes an instant messaging application.

A third feature, combinable with any of the previous or following features, further comprising acquiring address information of the second network node corresponding to the first network node before processing the affair of the affair processing request.

A fourth feature, combinable with any of the previous or following features, further comprising determining content of the to-be-acquired second affair confirmation from the second network node.

A fifth feature, combinable with any of the previous or following features, further comprising processing the affair of the affair processing request.

A sixth feature, combinable with any of the previous or following features, wherein the processing is performed on the basis of the received first affair content information, the received content of the second affair information, and the acquired address information.

In a second implementation, a computer-readable medium storing one or more instructions executable by a computer system to perform operations comprising: receiving an affair processing request from a first network node; receiving first affair information determined by the first network node; determining a type of to-be-acquired second affair information excluded from the received first affair information; transmitting first information comprising the type of the to-be-acquired second affair information to a second network node; receiving second information comprising content of the second affair information that is fed back by the second network node; and processing an affair of the affair processing request on the basis of the received first affair information and the received content of the second affair information.

The foregoing and other described implementations can each, optionally, include one or more of the following features:

A first feature, combinable with any of the following features, further comprising determining a correspondence between a first user logged on to a first client terminal at a first network node and a second user logged on to a second client terminal at a second network node.

A second feature, combinable with any of the previous or following features, wherein the correspondence includes an instant messaging application.

A third feature, combinable with any of the previous or following features, further comprising acquiring address information of the second network node corresponding to the first network node before processing the affair of the affair processing request.

A fourth feature, combinable with any of the previous or following features, further comprising determining content of the to-be-acquired second affair confirmation from the second network node.

A fifth feature, combinable with any of the previous or following features, further comprising processing the affair of the affair processing request.

A sixth feature, combinable with any of the previous or following features, wherein the processing is performed on the basis of the received first affair content information, the received content of the second affair information, and the acquired address information.

In a third implementation, a non-transitory, computer-readable medium storing one or more instructions executable by a computer system to perform operations comprising: receiving an affair processing request from a first network node; receiving first affair information determined by the first network node; determining a type of to-be-acquired second affair information excluded from the received first affair information; transmitting first information comprising the type of the to-be-acquired second affair information to a second network node; receiving second information comprising content of the second affair information that is fed back by the second network node; and processing an affair of the affair processing request on the basis of the received first affair information and the received content of the second affair information.

The foregoing and other described implementations can each, optionally, include one or more of the following features:

A first feature, combinable with any of the following features, further comprising determining a correspondence between a first user logged on to a first client terminal at a first network node and a second user logged on to a second client terminal at a second network node.

A second feature, combinable with any of the previous or following features, wherein the correspondence includes an instant messaging application.

A third feature, combinable with any of the previous or following features, further comprising acquiring address information of the second network node corresponding to the first network node before processing the affair of the affair processing request.

A fourth feature, combinable with any of the previous or following features, further comprising determining content of the to-be-acquired second affair confirmation from the second network node.

A fifth feature, combinable with any of the previous or following features, further comprising processing the affair of the affair processing request.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatus, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   storing, by a server, a mapping relationship table between activity IDs and types of activity information;
   receiving, by the server, an activity processing request from a first user account of a social network, wherein the activity processing request comprises sending a gift from the first user account to a second user account of the social network;
   determining, by the server, an activity ID corresponding to the activity processing request;
   querying, by the server and based on the activity ID, the mapping relationship table to obtain one or more type of to-be-acquired activity information corresponding to the activity processing request;
   determining, by the server and based on the one or more type of to-be-acquired activity information, one or more type of to-be-acquired first activity information;
   receiving, by the server, first activity information determined by the first user account, the first activity information corresponding to the one or more type of to-be-acquired first activity information;
   determining, by the server and based on the first activity information and the one or more type of to-be-acquired activity information, one or more type of to-be-acquired second activity information that is excluded from the first activity information;
   transmitting, by the server, the one or more type of to-be-acquired second activity information to the second user account;
   receiving, by the server, content of the one or more type of to-be-acquired second activity information from the second user account; and
   processing, by the server, an activity associated with the activity processing request based on the first activity information from the first user account and the content of the one or more type of to-be-acquired second activity information from the second user account.

2. The computer-implemented method of claim 1, further comprising determining a correspondence between a first user logged on to a first client terminal at the first user account and a second user logged on to a second client terminal at the second user account.

3. The computer-implemented method of claim 2, wherein the correspondence includes an instant messaging application.

4. The computer-implemented method of claim 1, further comprising acquiring address information of the second user account corresponding to the first user account before processing the activity associated with the activity processing request.

5. The computer-implemented method of claim 1, further comprising determining the content of the one or more type of to-be-acquired second activity information from the second user account.

6. The computer-implemented method of claim 4, further comprising processing the activity associated with the activity processing request.

7. The computer-implemented method of claim 6, wherein the processing is performed based on the first activity information, the content of the one or more type of to-be-acquired second activity information, and the address information of the second user account corresponding to the first user account.

8. A non-transitory, computer-readable medium storing one or more instructions executable by a computer system to perform operations comprising:
   storing, by a server, a mapping relationship table between activity IDs and types of activity information;
   receiving, by the server, an activity processing request from a first user account of a social network, wherein the activity processing request comprises sending a gift from the first user account to a second user account of the social network;
   determining, by the server, an activity ID corresponding to the activity processing request;
   querying, by the server and based on the activity ID, the mapping relationship table to obtain one or more type of to-be-acquired activity information corresponding to the activity processing request;
   determining, by the server and based on the one or more type of to-be-acquired activity information, one or more type of to-be-acquired first activity information;
   receiving, by the server, first activity information determined by the first user account, the first activity information corresponding to the one or more type of to-be-acquired first activity information;
   determining, by the server and based on the first activity information and the one or more type of to-be-acquired activity information, one or more type of to-be-acquired second activity information that is excluded from the first activity information;

transmitting, by the server, the one or more type of to-be-acquired second activity information to the second user account;

receiving, by the server, content of the one or more type of to-be-acquired second activity information from the second user account; and processing, by the server, an activity associated with the activity processing request based on the first activity information from the first user account and the content of the one or more type of to-be-acquired second activity information from the second user account.

9. The non-transitory, computer-readable medium of claim 8, further comprising determining a correspondence between a first user logged on to a first client terminal at the first user account and a second user logged on to a second client terminal at the second user account.

10. The non-transitory, computer-readable medium of claim 9, wherein the correspondence includes an instant messaging application.

11. The non-transitory, computer-readable medium of claim 8, further comprising acquiring address information of the second user account corresponding to the first user account before processing the activity associated with the activity processing request.

12. The non-transitory, computer-readable medium of claim 8, further comprising determining the content of the one or more type of to-be-acquired second activity information from the second user account.

13. The non-transitory, computer-readable medium of claim 11, further comprising processing the activity associated with the activity processing request.

14. The non-transitory, computer-readable medium of claim 13, wherein the processing is performed based on the first activity information, the content of the one or more type of to-be-acquired second activity information, and the address information of the second user account corresponding to the first user account.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
storing, by a server, a mapping relationship table between activity IDs and types of activity information;
receiving, by the server, an activity processing request from a first user account of a social network, wherein the activity processing request comprises sending a gift from the first user account to a second user account of the social network;
determining, by the server, an activity ID corresponding to the activity processing request;
querying, by the server and based on the activity ID, the mapping relationship table to obtain one or more type of to-be-acquired activity information corresponding to the activity processing request;
determining, by the server and based on the one or more type of to-be-acquired activity information, one or more type of to-be-acquired first activity information;
receiving, by the server, first activity information determined by the first user account, the first activity information corresponding to the one or more type of to-be-acquired first activity information;
determining, by the server and based on the first activity information and the one or more type of to-be-acquired activity information, one or more type of to-be-acquired second activity information that is excluded from the first activity information;
transmitting, by the server, the one or more type of to-be-acquired second activity information to the second user account;
receiving, by the server, content of the one or more type of to-be-acquired second activity information from the second user account; and
processing, by the server, an activity associated with the activity processing request based on the first activity information from the first user account and the content of the one or more type of to-be-acquired second activity information from the second user account.

16. The computer-implemented system of claim 15, further comprising determining a correspondence between a first user logged on to a first client terminal at the first user account and a second user logged on to a second client terminal at the second user account.

17. The computer-implemented system of claim 16, wherein the correspondence includes an instant messaging application.

18. The computer-implemented system of claim 15, further comprising acquiring address information of the second user account corresponding to the first user account before processing the activity associated with the activity processing request.

19. The computer-implemented system of claim 15, further comprising determining the content of the one or more type of to-be-acquired second activity information from the second user account.

20. The computer-implemented system of claim 18, further comprising processing the activity associated with the activity processing request.

* * * * *